United States Patent [19]

Sugawara

[11] Patent Number: 5,619,189

[45] Date of Patent: Apr. 8, 1997

[54] COMMUNICATION SYSTEM HAVING TWO OPPOSED DATA PROCESSING UNITS EACH HAVING FUNCTION OF MONITORING THE OTHER DATA PROCESSING UNIT

[75] Inventor: Eiji Sugawara, Yokohama, Japan

[73] Assignee: Fujitsu Limited, Kawasaki, Japan

[21] Appl. No.: 544,254

[22] Filed: Oct. 17, 1995

Related U.S. Application Data

[63] Continuation of Ser. No. 371,582, Jan. 12, 1995, abandoned, which is a continuation of Ser. No. 95,998, Jul. 23, 1993, abandoned, which is a continuation of Ser. No. 734,122, Jul. 25, 1991, abandoned, which is a continuation of Ser. No. 490,919, Mar. 9, 1990, abandoned.

[30] Foreign Application Priority Data

Mar. 16, 1989 [JP] Japan ............................ 1-64589

[51] Int. Cl.$^6$ ............................................. H04Q 1/00
[52] U.S. Cl. ..................... 340/825.06; 340/825.79; 340/825.18; 307/112; 370/360
[58] Field of Search .............................. 340/825.06, 825, 340/825.18, 825.79, 825.89, 825.01, 825.5; 307/112; 370/60

[56] References Cited

U.S. PATENT DOCUMENTS

| | | | |
|---|---|---|---|
| 3,337,992 | 8/1967 | Tolson | 340/825 |
| 3,641,326 | 2/1972 | Harte | 340/825.06 X |
| 3,876,987 | 4/1975 | Dalton et al. | 340/172.5 |
| 3,878,510 | 4/1975 | Smith | 307/115 |
| 4,057,785 | 11/1977 | Furniss | 340/825.06 X |
| 4,254,307 | 3/1981 | Plunkett, Jr. | 340/825.5 |
| 4,479,122 | 10/1984 | Redman et al. | 340/825 |
| 4,604,693 | 8/1986 | Chadima, Jr. et al. | 364/200 |
| 4,766,330 | 8/1988 | Dreiei | 307/115 X |
| 4,872,004 | 10/1989 | Bahnick et al. | 340/825.5 |
| 4,939,719 | 7/1990 | Bakka | 370/60 |
| 4,954,821 | 9/1990 | Gray et al. | 340/825.5 |
| 4,962,379 | 10/1990 | Yasuda et al. | 340/825.5 |

FOREIGN PATENT DOCUMENTS

| | | |
|---|---|---|
| 5464 | 12/1987 | Japan . |
| 297960 | 12/1987 | Japan . |
| 2056133 | 3/1981 | United Kingdom . |

*Primary Examiner*—Brian Zimmerman
*Attorney, Agent, or Firm*—Staas & Halsey

[57] ABSTRACT

A communication system includes a first data processing unit, a second data processing unit, and a data link line provided between the first data processing unit and the second data processing unit. A first monitor terminal controls the first data processing unit and monitors the first and second data processing units. A second monitor terminal controls the second data processing unit and monitors the first and second data processing units. A first switching circuit is coupled to the first data processing unit, the first monitor terminal and the data link line, and selectively connects two of the first data processing unit, the first monitor terminal and the data link line. A second switching circuit is coupled to the second data processing unit, the second monitor terminal and the data link line, and selectively connects two of the second data processing unit, the second monitor terminal and the data link line. The first switching circuit has a mode in which the first terminal is connected to the data link line and the second switching circuit has a mode in which the second data processing unit is connected to the data link line so that the first monitor terminal monitors the second data processing unit.

11 Claims, 4 Drawing Sheets

COMMUNICATION SYSTEM HAVING TWO OPPOSED DATA PROCESSING UNITS EACH HAVING FUNCTION OF MONITORING THE OTHER DATA PROCESSING UNIT

This application is a continuation of application Ser. No. 08/371,582, filed Jan. 12, 1995, now abandoned, which is a continuation of application Ser. No. 08/095,998, filed Jul. 23, 1993, now abandoned, which is a continuation of application Ser. No. 07/734,122, filed Jul. 25, 1991, abandoned, which is a continuation of application Ser. No. 07/490,919, filed Mar. 9, 1990, now abandoned.

BACKGROUND OF THE INVENTION

The present invention generally relates to a communication system having two opposed data processing units each having a function of monitoring the other data processing unit.

There is known a communication system having two microprocessor units which are coupled to each other through a data link line. The microprocessor units each control respective devices such as multiplexers. A hand held monitor is provided for each of the microprocessor units. The operator can access the microprocessor unit through the associated hand held monitor. When the operator on the side of one of the microprocessor units wishes to obtain data relating on the other microprocessor unit or its peripheral device such as a multiplexer, the operator inputs an instruction to the microprocessor unit of its own through the associated hand held monitor. The input instruction is converted into a conventional format under the control of a central processing unit of the microprocessor unit on the operator side, and is then transmitted to the other microprocessor unit through the data link line. The other microprocessor unit analyzes the received instruction and generates requested data. Then the other microprocessor unit converts the same into a conventional format and sends the requested data to the microprocessor unit on the operator side through the data link line. The central processing unit of the microprocessor unit on the side of the operator analyzes the received requested data and provides the operator with an indication based on the requested data through the hand held monitor. Thereby, the operator on the side of one of the microprocessor units can monitor the status of the other microprocessor unit or devices controlled thereby.

It is noted that a processing of the central processing unit on the operator side is needed to obtain data on the other microprocessor unit or its peripheral device. As described previously, the central processing unit on the side of the operator converts the input instruction into the conventional format and analyzes the received data assembled in the conventional format. Such a processing is a load of the central processing unit. When the central processing unit has a sufficient operating capacity, there is no problem even when the above-mentioned processing is executed. However, when the central processing unit is operating with a heavy load, the operating speed is decreased so that services provided by the microprocessor unit are degraded. For example, it takes a long time to obtain data on the other microprocessor unit.

SUMMARY OF THE INVENTION

It is a general object of the present invention to provide an improved communication system having two data processing units each having the function of monitoring the other data processing unit, in which the aforementioned disadvantage is got rid of.

A more specific object of the present invention is to provide a communication system in which data relating to the other data processing unit can be obtained without providing a microprocessor unit in the system with a load.

The above objects of the present invention are achieved by a communication system comprising a first data processing unit, a second data processing unit, and a data link line provided between the first data processing unit and the second data processing unit. The communication system further comprises first monitor terminal means for controlling the first data processing unit and for monitoring the first and second data processing units, second monitor terminal means for controlling the second data processing unit and for monitoring the first and second data processing units, first switching means coupled to the first data processing unit, the first monitor terminal means and the data link line, for selectively connecting two of the first data processing unit, the first monitor terminal means and the data link line, and second switching means coupled to the second data processing unit, the second monitor terminal means and the data link line, for selectively connecting two of the second data processing unit, the second monitor terminal means and the data link line. The first switching means has a mode in which the first terminal is connected to the data link line and the second switching means has a mode in which the second data processing unit is connected to the data link line so that the first monitor terminal means monitors the second data processing unit.

Additional objects, features and advantages of the present invention will become apparent from the following detailed description when read in conjunction with the accompanying drawings.

DESCRIPTION OF THE PREFERRED EMBODIMENT

Figure 1:
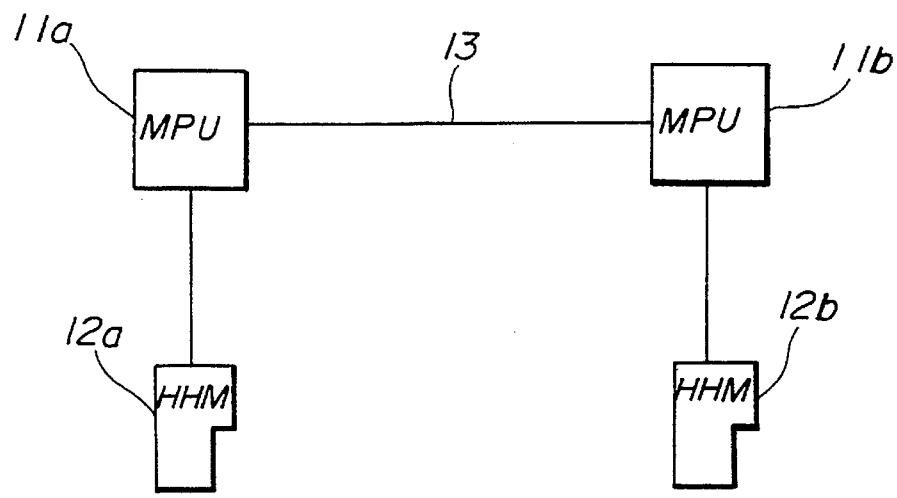
FIG. 1 is a block diagram illustrating an outline of a conventional communication system.
Figure 2:
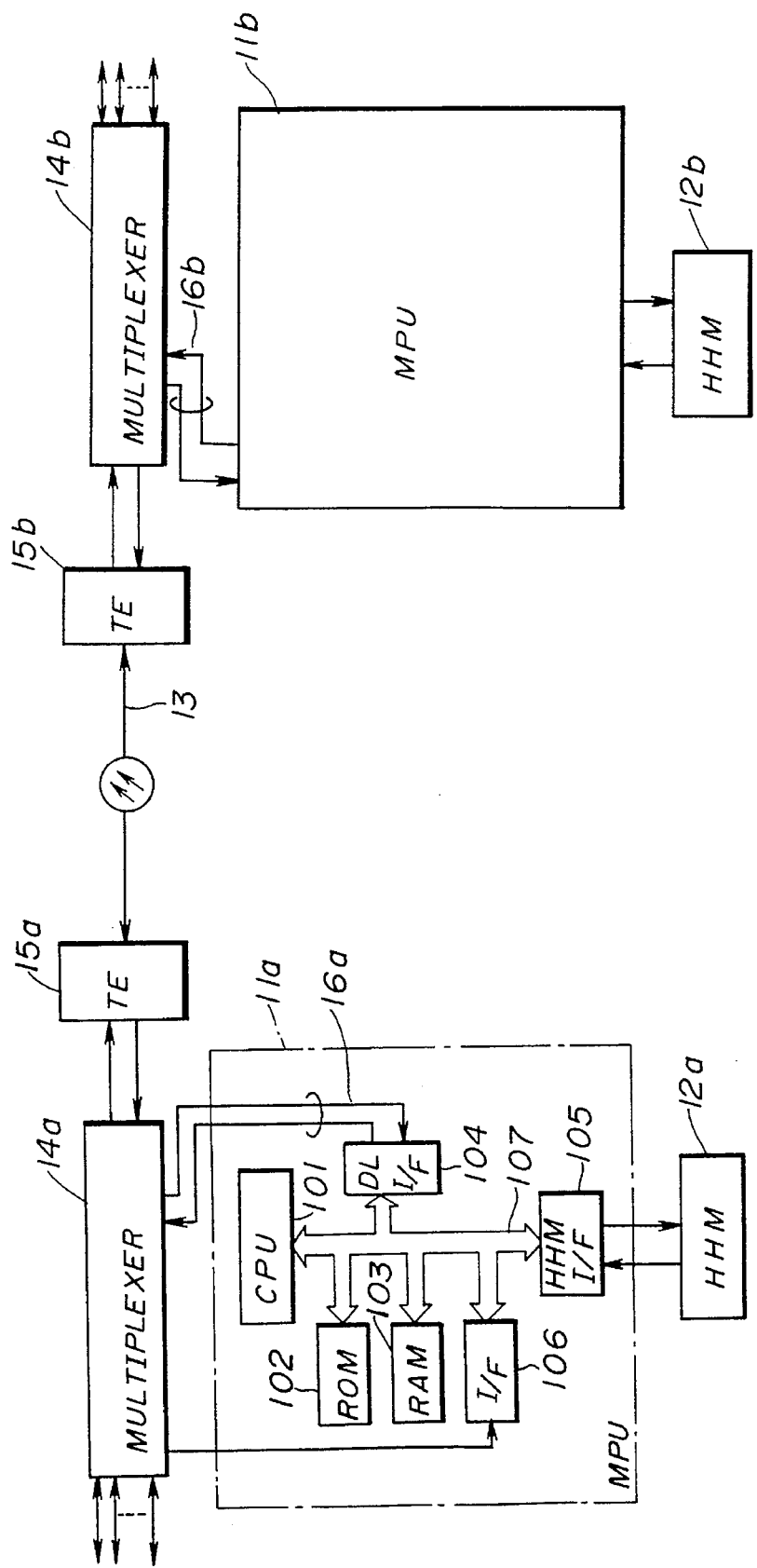
FIG. 2 is a block diagram of an application of the conventional communication system shown in FIG. 1.

To facilitate understanding the present invention, a description is given of a conventional communication system with reference to FIGS. 1 and 2.

Referring to FIG. 1, there is a conventional communication system having two opposed microprocessor units (hereinafter simply referred to as MPUs) 11a and 11b each serving as a data processing unit and having the function of monitoring the other unit. The MPUs 11a and 11b are mutually connected through a pair of data link lines 13. Hand held monitors (hereinafter simply referred to as HHMs) 12a and 12b are connected to the MPUs 11a and 11b, respectively. The HHM 12a enables the operator to access the MPU 11a. Similarly, the HHM 12b enables the operator to access the MPU 11b.

When the operator on the side of the HHM 12a wishes to obtain data on the status of the MPU 11b or a peripheral device (not shown) controlled thereby, the operator inputs an instruction to the MPU 11a through the HHM 12a. The MPU 11a converts the input instruction into a conventional format and transmits the same to the MPU 11b through one of the data link lines 13. The MPU 11b analyzes the received instruction and generates requested data indicating the status thereof or its peripheral device. Then the MPU 11b sends the requested data to the MPU 11a through the data link line 13. The MPU 11a analyzes the received data and lets the operator know, through the HHM 12a, the status of the MPU 11b or the device controlled thereby.

FIG. 2 is a block diagram of an application of the system shown in FIG. 1. The configuration shown in FIG. 2 is a data communication system, which includes multiplexers 14a and 14b each having the functions of multiplexing and demultiplexing, terminal equipments 15a and 15b. The MPU 11a includes a central processing unit (hereinafter simply referred to as a CPU) 101, a read only memory (ROM) 102, a random access memory (RAM) 103, a data link interface 104, an HHM interface 105, a multiplexer interface 106 and a bus 107. A first data processing unit is configured by the MPU 11a, the HHM 12a, the multiplexer 14a and the terminal equipment 15a. Similarly, a second data processing unit is configured by the MPU 11b, the HHM 12b, the multiplexer 14b and the terminal equipment 15b.

The MPU 11a communicates with the HHM 12a through the HHM interface 105. The MPU 11a is coupled to the multiplexer 14a through the data link interface 104 and a pair of data link lines 16a. The MPU 11a is also coupled to the multiplexer 14a through the multiplexer interface 106. The CPU 101 controls the multiplexer 14a through the multiplexer interface 106. The multiplexer 14a multiplexes a plurality of signals input thereto and generates a multiplexed signal. Further, the multiplexer 14a demultiplexes a multiplexed signal from the terminal equipment 15 to thereby generate a plurality of signals. The ROM 102 stores programs which control processing of the CPU 101. The RAM 103 serves as a working memory for the CPU 101. The MPU 11b, the multiplexer 14b and the terminal equipment 15b are configured in the same manner as corresponding those in FIG. 2.

When the operator on the side of the MPU 11a wishes to obtain data relating to the multiplexer 14b, for example, the operator inputs an instruction to the MPU 11a through the HHM 12a. The instruction is supplied to the CPU 101 through the HHM interface 105 and the bus 107. The CPU 101 controls the data link interface 104 to convert the instruction into a conventional format (including a serial-to-parallel conversion) and to supply the same to the multiplexer 14a. The multiplexed signal output from the multiplexer 14a contains services (auxiliary or idle) bits. The multiplexer 14a uses such services bits to send the instruction supplied from the data link interface 104 to the terminal equipment 15a. The terminal equipment 15a amplifies the electrical signal from the multiplexer 14a and converts the same into an optical signal. The pair of the data link lines 13 is formed by an optical fiber cable (or cables). The optical signal is transmitted to the terminal equipment 15b through the optical fiber cable 13.

The terminal equipment 15b converts the optical signal from the terminal equipment 15a into an electrical signal, which is then demultiplexed by the multiplexer 14b. Then the multiplexer 14b extracts the service bits for forming the instruction described in the conventional format and supplies the MPU 11b with the extracted bits through a pair of data link lines 16b. The MPU 11b analyzes the instruction from the MPU 11a, and generates requested data relating to the multiplexer 14b requested by the received instruction. The requested data is transmitted, in the conventional format using some of service bits contained in the multiplexed signal, to the multiplexer 14a through the multiplexer 14b, the terminal equipment 15b, the optical fiber cable 13 and the terminal equipment 15a. The multiplexer 14a extracts the service bits for transmitting the requested data and supplies the CPU 101 with the same through one of the data link lines 16a and the data link interface 104. The CPU 101 analyzes the received requested data in the conventional format and forms data to be supplied to the HHM 12a. Then the CPU 101 supplies the HHM 12a with the data relating to the multiplexer 14b through the bus 107 and the HHM interface 105.

The above-mentioned procedure needs a processing of the CPU 101 in the MPU 11a. That is, the monitoring procedure gives the CPU 101 a load. The present invention is directed to providing a communication system capable of obtaining data relating to the other device without providing the MPU 11a or 11b on the operator side with a load.

Figure 3:
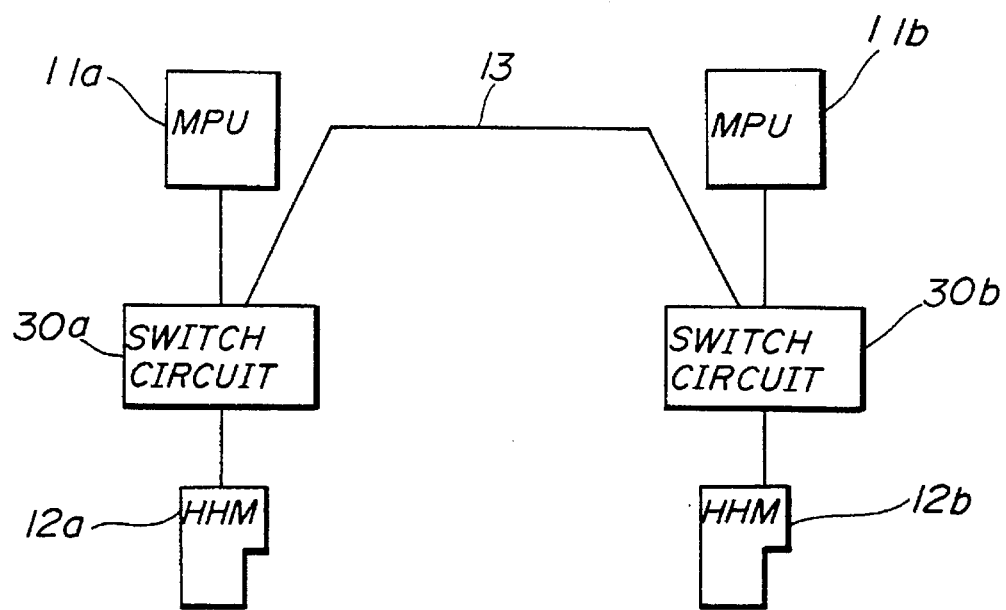
FIG. 3 is a block diagram illustrating an outline of a communication system according to the present invention.

Referring to FIG. 3, there is illustrated an outline of a communication system according to the present invention, in which those parts which are the same as those shown in the previous figures are given the same reference numerals. According to the present invention, two switching circuits 30a and 30b are provided. As will be seen from the following description, each of the switching circuits 30a and 30b has three modes. Normally, the switching circuit 30a connects the MPU 11a and the data link line 13, and the switching circuit 30b connects the MPU 11b and the data link line 13. When the operator on the side of the MPU 11a wishes to obtain data relating to the MPU 11b, the operator manually controls the switching circuit 30a so as to connect the HHM 12a and the data link line 13. Thereby, the HHM 12a is coupled to the MPU 11b on the other side through the switching circuit 30a, the data link line 13 and the switching circuit 30b. Thus, the operator can give an instruction directly to the MPU 11b without the control of the MPU 11a. When receiving the instruction from the HHM 12a, the MPU 11b generates requested data, and sends the same to the HHM 12a through the switching circuit 30b, the data link line 13 and the switching circuit 30a. The operator on the side of the MPU 11a can obtain the requested data relating to the MPU 11b through the HHM 12a. Thus, it is possible to reduce the storage capacity of each of the ROM 102 and the RAM 103.

When the operator on the side of the MPU 11a wishes to obtain data relating thereto, the operator manually controls the switching circuit 30a so that the HHM 12a is connected to the MPU 11a. Thereby, the operator can obtain requested data relating to the MPU 11a. Of course, the operator on the side of the MPU 11b can access the MPU 11a through the switching circuit 30b, the data link line 13 and the switching circuit 30a without the control of the MPU 11b during the time when the switching circuit 30a connects the data line 116a and the MPU 111a. Thus, it is possible to reduce the storage capacity of each of the ROM 102 and the RAM 103.

Figure 4:
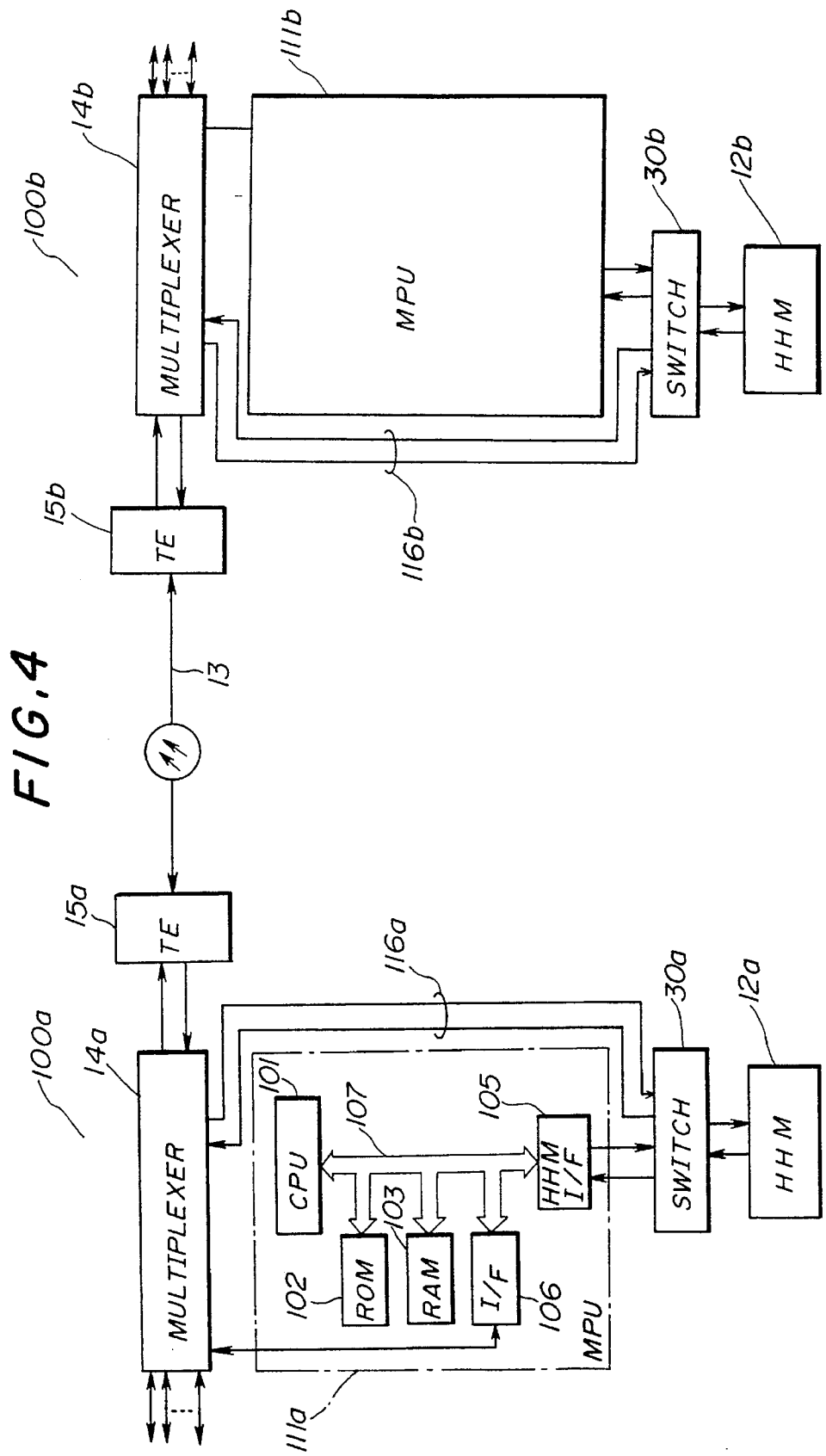
FIG. 4 is a block diagram of a communication system according to a preferred embodiment of the present invention.

FIG. 4 is a block diagram of a configuration obtained by applying the present invention to the system shown in FIG. 2. In FIG. 4, those parts which are the same as those shown in FIG. 2 are given the same reference numerals. The switching circuit 30a is connected to a pair of lines connected to the HHM 12a, a pair of data link lines 116a and a pair of lines connected to an MPU 111a. Normally, the switching circuit 30a connects the MPU 111a and the multiplexer 14a. The switching circuit 30a selectively connects the HHM 12a and the data link lines 116a, and selectively connects the HHM 12a and the MPU 111a. The switching circuit 30b is connected to the lines connected to the HHM 12b, the data link lines 116a and the lines connected to an MPU 111b in the same way as the switching circuit 30a. Normally, the switching circuit 30b connects the MPU 111b and the multiplexer 14b. The switching circuit 30b selectively connects the HHM 12b and the data link lines 116b, and selectively connects the HHM 12b and the MPU 111b. The MPU 111a, the multiplexer 14a and the terminal equipment 15a form a data processing unit 100a, and the MPU 111b, the multiplexer 14b and the terminal equipment 15b form a data processing unit 100b.

When the operator on the side of the multiplexer 14a wishes to obtain data relating to the multiplexer 14b on the other side, the operator manually controls the switching circuit 30a so that the HHM 12a is connected to the multiplexer 14a. The operator inputs an instruction to request data relating to the multiplexer 14b. This is inserted into some of service bits by the multiplexer 14a, and is transmitted to the multiplexer 14b through the terminal equipment 15a, the optical fiber cable 13 and the terminal equipment 15b. The service bits used for transmitting an instruction are extracted by the multiplexer 14b and then supplied to the MPU 111b through the switching circuit 30b. The MPU 111b investigates the status of the multiplexer 14b and generates requested data indicative of the results of investigation. The requested data from the MPU 111b passes through the switching circuit 30b and the data link line 116b and is supplied to the multiplexer 14b. The multiplexer 14b transfers the received data to the multiplexer 14a by using some of service bits. The service bits are extracted by the multiplexer 14a and then supplied to the HHM 12a through the data link lines 116a and the switching circuit 30a. Thereby, the operator can know the status of the multiplexer 14b from the received request without using the CPU 101 of the MPU 111a.

Figure 5:
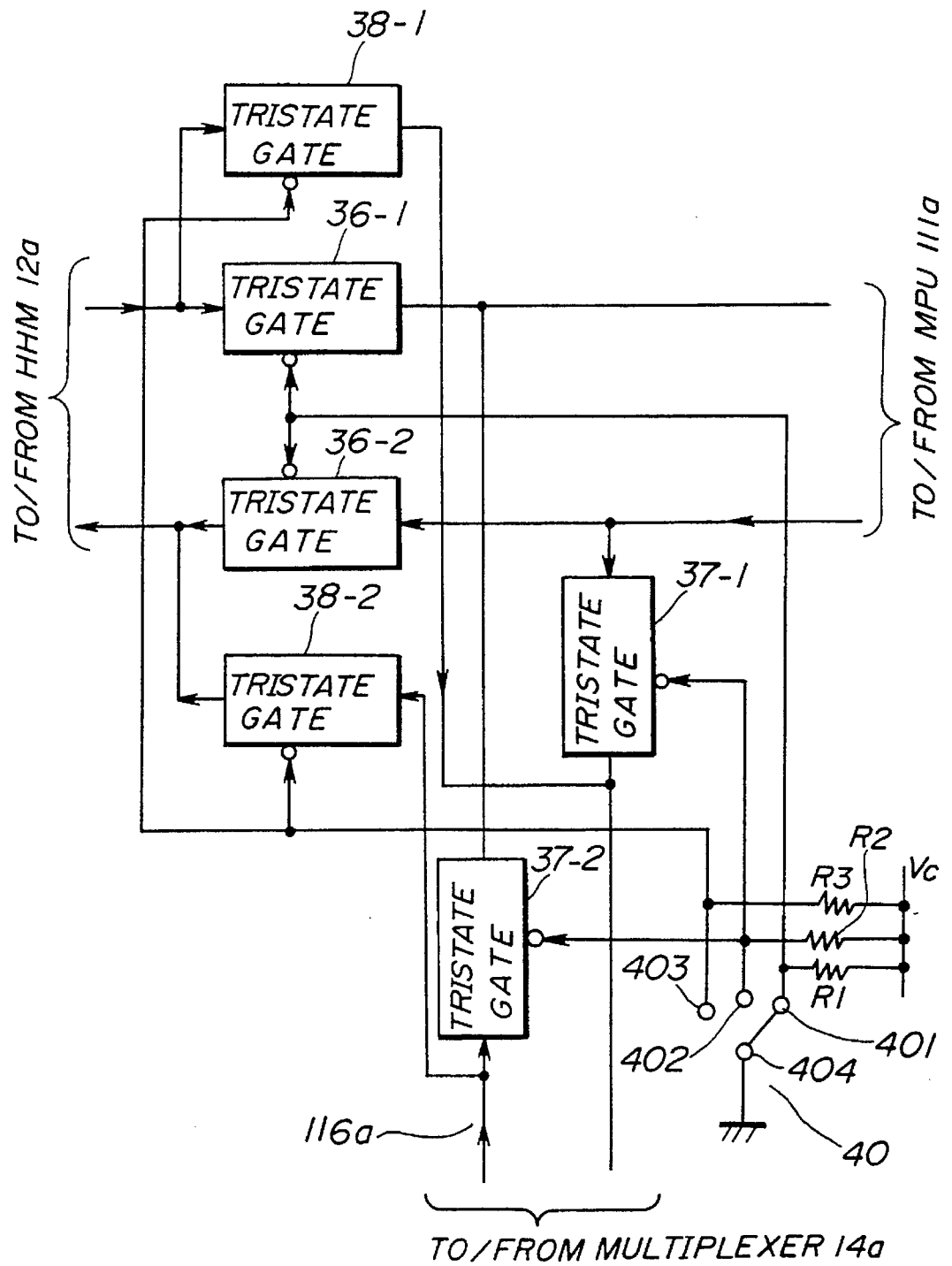
FIG. 5 is a circuit diagram of a switching circuit shown in FIG. 4.

FIG. 5 is a circuit diagram of the switching circuit 30a. The switching circuit 30b has the same configuration as the switching circuit 30a. Tristate gates 36-1 and 36-2 are coupled to the HHM 12a. One of the lines which extends from the HHM 12a is connected to an input terminal of the tristate gate 36-1, and the other line which extends to the HHM 12a is connected to an output terminal of the tristate gate 36-2. An output terminal of the tristate gate 36-1 and an input terminal of the tristate gate 36-2 are coupled to the MPU 111a. The tristate gates 36-1 and 36-2 are controlled by a manual switch 40, which has three stationary contacts 401, 402 and 403, and a single movable contact 404. Control terminals of the tristate gates 36-1 and 36-2 are connected to the contact 401 of the manual switch 40. The contact 401 is pulled up to a positive power source voltage Vc through a resistor R1. When the manual switch 40 selects the contact 401 so that it is grounded, the tristate 36-1 and 36-2 are ON.

Tristate gates 38-1 and 38-2 are also connected to the HHM 12a. One of the lines which extends from the HHM 12a is connected to an input terminal of the tristate gate 38-1, and the other line which extends to the HHM 12a is connected to an output terminal of the tristate gate 38-2. The tristate gates 38-1 and 38-2 individually have control terminals, which are connected to the contact 403 of the manual switch 40. The contact 403 is pulled up to the positive power source voltage Vc through a resistor R3. When the manual switch 40 selects the contact 403 so that it is grounded, the tristate gates 38-1 and 38-2 are ON. An output terminal of the tristate gate 38-1 and an input terminal of the tristate gate 38-2 are connected to the multiplexer 14a through the data link lines 116a.

Tristate gates 37-1 and 37-2 are connected to the multiplexer 14a. An input terminal of the tristate gate 37-1 is connected to one of the lines which extends from the MPU 111a. An output terminal of the tristate gate 37-2 is connected to the other line which extends to the MPU 111a. An output terminal of the tristate gate 37-1 is connected to one of the lines which extends to the multiplexer 14a, and an input terminal of the tristate gate 37-2 is connected to the other line of the multiplexer 14a. The tristate gates 37-1 and 37-2 are controlled by the manual switch 40. The tristate gates 37-1 and 37-2 individually have control terminals, which are connected to the contact 402 of the manual switch 40. The contact 402 is pulled up to the positive power source voltage Vc through a resistor R2. When the manual switch 40 selects the contact 402 so that it is grounded, the tristate gates 37-1 and 37-2 are ON.

Each of the tristate gates 36-1, 36-2, 37-1, 37-2, 38-1 and 38-2 can be formed by a marketed IC chip having, for example, a type number of 74125. Each tristate gate formed by this IC chip is ON when a low-level (ground) signal is supplied to the control terminal thereof, and alternatively OFF (high-impedance state) with a high-level (Vc) signal applied to the control terminal thereof. The interface between the MPU 111a and the HHM 12a is formed by a conventional interface in which the signal lines are high when they are idle. All the signal lines shown in FIG. 5 are high when they are idle.

A description is given of the operation of the switching circuit 30a. Normally, the manual switch 40 selects the contact 402 so that the multiplexer 14a and the MPU 111a are mutually connected through the tristate gates 37-1 and 37-2 in the two ways. During this time, the other tristate gates 36-1, 36-2, 38-1 and 38-2 are OFF. In this state, the MPU 111a can be accessed by the operator on the side of the MPU 111b. In this case, the function of the data link interface 104 (shown in FIG. 2) is provided by the HHM interface 105.

When the operator on the side of the MPU 111a wishes to access the MPU 111a, the operator turns the manual switch 40 so as to select the contact 401. Thereby only the tristate gates 36-1 and 36-2 are turned ON, and the HHM 12a and the MPU 111a are mutually connected in the two ways.

When the operator on the side of the MPU 111a wishes to obtain data relating to the multiplexer 14b on the other side, the operator turns the manual switch 40 and selects the contact 403. Thereby, the tristate gates 38-1 and 38-2 are turned ON, while the other tristate gates are OFF. The HHM 12a and the multiplexer 14a are mutually connected in the two ways. In the normal state, the HHM 12a may be connected to the MPU 111a through the switching circuit 30a. That is, the the manual switch 40 selects the contact 401. It is, however, noted that during this time, the operator on the side of the multiplexer 111b cannot access the MPU 111a.

The aforementioned tristate gates can be replaced by alternative switching elements such as analog switches.

In a communication system, an MPU manages a plurality of devices. For example, the MPU 111b manages a plurality of multiplexers (including the multiplexer 14b). In such a system, the operator on the side of the MPU 111a can directly access the MPU 111b and obtain data relating to the multiplexers managed by the MPU 111b in the aforementioned manner.

The present invention is not limited to the specifically described embodiment, and variations and modifications may be made without departing from the scope of the present invention.

What is claimed is:

1. A communication system, comprising:

a data link line;

a first communication control device connected to a first end of said data link line;

a second communication control device connected to a second end of said data link line a first data processing unit controlling and monitoring a status of said first communication control device;

a second data processing unit controlling and monitoring a status of said second communication control device;

first monitor terminal means for controlling said first data processing unit and for monitoring the status of said first and second communication control devices;

second monitor terminal means for controlling said second data processing unit and for monitoring the status of said first and second communication control devices;

first switching means coupled to said first data processing unit, said first monitor terminal means and said data link line, for selectively connecting two of said first data processing unit, said first monitor terminal means and said data link line for establishing bidirectional communication between two of said first data processing unit, said first monitor terminal means and said data link line, and allowing the status of said second communication control device to be provided directly to said first monitor terminal bypassing said first data processing unit, said first switching means comprising:

a first switching circuit having a control terminal and connecting said first data processing unit and said data link line when a first control signal is applied to said control terminal thereof;

a second switching circuit having a control terminal and connecting said first data processing unit and said first monitor terminal means when a second control signal is applied to said control terminal thereof;

a third switching circuit having a control terminal and connecting said first monitor terminal means and said data link line when a third control signal is applied to said control terminal thereof; and first manual changing means coupled to said control terminals of said first, second and third switching circuits, for manually generating first, second and third control signals respectively supplied to said control terminals of said first, second and third switching circuits so that any one of said first, second and third control signals is applied to a corresponding one of said terminals of said first, second and third switching circuits; and second switching means coupled to said data processing unit, said second monitor terminal means and said data link line, for selectively connecting two of said second data processing unit, said second monitor terminal means and said data link line, for establishing a bidirectional communication between two of said second data processing unit, said second monitor terminal means and said data link line, said data link line being provided between said first switching means and said second switching means, and allowing the status of said first communication control device to be provided directly to said second monitor terminal bypassing said second data processing unit, said second switching means comprising:

a fourth switching circuit having a control terminal and connecting said second data processing unit and said data link line only when a first control signal is applied to said control terminal thereof;

a fifth switching circuit having a control terminal and connecting said second data processing unit and said second monitor terminal means only when a second control signal is applied to said control terminal thereof; and a sixth switching circuit having a control terminal and connecting said second monitor terminal means and said data link line only when a third control signal is applied to said control terminal thereof; and second manual changing means, coupled to said control terminals of said fourth through sixth switching circuits for manually generating fourth, fifth and sixth control signals, respectively supplied to said control terminals of said fourth, fifth and sixth switching circuits so that one of said fourth, fifth, and sixth control signals is applied to a corresponding one of said terminals of said fourth, fifth and sixth switching circuits, said first switching means has a mode in which said first monitor terminal means is connected to said data link line and said second switching means has a mode in which said second data processing unit is connected to said data link line so that said first monitor terminal means monitors said second data processing unit.

2. A communication system as claimed in claim 1, wherein said first control means comprises:

a first switch having first, second and third stationary contacts and a movable contact which is selectively connected to one of said first, second and third stationary contacts; and first, second and third resistors connected between said first, second and third stationary contacts, respectively, and wherein:

said movable contact is grounded;

said first stationary contact is connected to said control terminal of said first switching means;

said second stationary contact is connected to said terminal of said second switching means; and said third stationary contact is connected to said terminal of said third switching means.

3. A communication system as claimed in claim 1, wherein said second control means comprises:

a second switch having first, second and third stationary contacts and a movable contact which is selectively one of said first, second and third stationary contacts; and first, second and third resistors connected between said first, second and third stationary contacts, respectively, and wherein:

said movable contact is grounded;

said first stationary contact is connected to said control terminal of said fourth switching means;

said second stationary contact is connected to said control terminal of said fifth switching means; and said third stationary contact is connected to said control terminal of said sixth switching means.

4. A communication system as claimed in claim 1, wherein:

said first data processing unit is coupled to said first switching means through a first pair of lines, said first monitor terminal means is coupled to said first switching means through a second pair of lines, and said data link line includes a third pair of lines;

said first switching circuit includes a pair of tristate gates provided between said first pair of lines and said third pair of lines;

said second switching circuit includes a pair of tristate gates provided between said first pair of lines and said second pair of lines; and said third switching circuit includes a pair of tristate gates provided between said second pair of lines and said third pair of lines.

5. A communication system as claimed in claim 1, wherein:

said second data processing unit is coupled to said second switching means through a fourth pair of lines, said second monitor terminal means is coupled to said second switching means through a fifth pair of lines, and said data link line includes a sixth pair of lines;

said fourth switching circuit includes a pair of tristate gates provided between said fourth pair of lines and said sixth pair of lines;

said fifth switching circuit includes a pair of tristate gates provided between said fourth pair of lines and said fifth pair of lines; and said sixth switching circuit includes a pair of tristate gates provided between said fifth pair of lines and said sixth pair of lines.

6. A communication system as claimed in claim 1, wherein each of said first and second data processing units comprises:

signal processing means for multiplexing a plurality of input signals to generate a multiplexed transmit signal in digital form to be transmitted to said data link line and for demultiplexing a multiplexed receive signal from said data link line to thereby generate a plurality of output signals;

a microprocessor unit coupled to a corresponding one of said first and second switching means and controlling said multiplexer; and communication means coupled between said multiplexer and said data link line, for transmitting said multiplexed transmit signal on said data link line and receiving said multiplexed receive signal on said data link line.

7. A communication system as claimed in claim 6, wherein said multiplexed receive signal contains idle bits used for transmitting information indicative of a status of a corresponding one of said first and second data processing units.

8. A communication system as claimed in claim 6, wherein said multiplexed transmit signal contains idle bits used for transmitting information for monitoring a corresponding one of said first and second data processing units.

9. A communication system as claimed in claim 6, wherein:

said data link line comprises an optical fiber cable;

said communication means comprises conversion means for converting said multiplexed transmit signal into an optical transmit signal to be transmitted on said data link line and for converting said multiplexed transmit signal from said data link line into an electrical signal.

10. A processor communication system, comprising:

a remote communication control unit having a status;

a remote processor connected to said remote communication control unit, controlling said remote communications control unit and determining the status of said remote communication control unit;

a data communication line connected to said remote communications control unit;

a local communications control unit connected to said data communication line and having a status, information data and service data being communicated by said remote communication control unit, said data communication line and said local communications control unit;

a local processor connected to said dana communication line and said local communications control unit, and monitoring the status of said local communications control unit;

a manual switch connected to said local processor and said data communication line; and a local terminal connected to said manual switch, said manual switch being manually switchable by an operator between a first position connecting said local terminal to said local processor and a second position connecting said local terminal to said remote processor through said data communication line, controlling said local processor responsive to commands produced by the operator when said switch is in said first position and obtaining the status of said remote processor directly over data said communication line using the service data when said switch is in said second position responsive to status commands produced by the operator and bypassing said local processor and while said information data is being communicated.

11. A processor communication system, comprising:

a remote communication control unit having a status;

a remote processor connected to said remote communication control unit, controlling said remote communications control unit, having a status and determining the status of said remote communication control unit;

a data communication line connected to said remote communications control unit;

a local communications control unit connected to said data communication line and having a status;

a local processor connected to said data communication line and said local communications control unit, and monitoring the status of said local communications control unit;

a manual switch connected to said local processor and to said data communication line; and a local terminal connected to said manual switch, said manual switch being manually switchable by an operator between a first position connecting said local terminal to said local processor and a second position connecting said local terminal to said remote processor through said data communication line, controlling said local processor responsive to commands produced by the operator when said switch is in the first position and obtaining the status directly over said communication line when said switch is in the second position responsive to status commands produced by the operator and bypassing said local processor.

* * * * *

UNITED STATES PATENT AND TRADEMARK OFFICE
CERTIFICATE OF CORRECTION

PATENT NO. : 5,619,189
DATED : Apr. 8, 1997
INVENTOR(S) : SUGAWARA

It is certified that error appears in the above-indentified patent and that said Letters Patent is hereby corrected as shown below:

TITLE PAGE: [56] References Cited, at the end of this section, insert the following:

OTHER PUBLICATIONS

IBM TECHNICAL DISCLOSURE BULLETIN, Vol. 29, No. 7, Dec. 1986, New York, U.S., "Multi-Station Application Test System," pages 3159-3163.

Col. 10, line 14 (Claim 10, line 15), change "dana" to --data--.

Signed and Sealed this

Second Day of September, 1997

Attest:

BRUCE LEHMAN

Attesting Officer

Commissioner of Patents and Trademarks